US006980422B2

(12) United States Patent
Bhogal (10) Patent No.: US 6,980,422 B2
(45) Date of Patent: Dec. 27, 2005

(54) INTERNAL USB DRIVE HOUSING BAY

(75) Inventor: Kulvir Singh Bhogal, Fort Worth, TX (US)

(73) Assignee: International Business Machines Corporation, Armonk, NY (US)

( * ) Notice: Subject to any disclaimer, the term of this patent is extended or adjusted under 35 U.S.C. 154(b) by 189 days.

(21) Appl. No.: 10/713,738

(22) Filed: Nov. 13, 2003

(65) Prior Publication Data

US 2005/0105261 A1    May 19, 2005

(51) Int. Cl.[7] .............................................. G06F 1/16
(52) U.S. Cl. .................................. 361/683; 312/223.1
(58) Field of Search .................... 361/683; 312/223.1, 312/223.2

(56) References Cited

U.S. PATENT DOCUMENTS

| | | | | |
|---|---|---|---|---|
| 5,572,402 A | * | 11/1996 | Jeong | ........................ 361/685 |
| 5,961,359 A | * | 10/1999 | Kostick | .......................... 445/2 |
| 6,157,540 A | * | 12/2000 | Eddings et al. | .......... 312/223.2 |
| 6,227,632 B1 | * | 5/2001 | Liu | .......................... 312/223.2 |
| 6,407,911 B1 | * | 6/2002 | Spence et al. | .............. 361/683 |
| 6,445,576 B1 | * | 9/2002 | Wooden et al. | ............. 361/683 |
| 2001/0036060 A1 | * | 11/2001 | Saito et al. | .................. 361/683 |
| 2002/0101710 A1 | * | 8/2002 | Diaz | .......................... 361/683 |

* cited by examiner

*Primary Examiner*—Lisa Lea-Edmonds
(74) *Attorney, Agent, or Firm*—Diana R. Gerhardt; Dillon & Yudell LLP (57) ABSTRACT

A method and system for internally connecting a Universal Serial Bus (USB) device to a computer. An access door, hinged within a computer case, has a USB port attached to an interior of the door. To connect the USB device, the access door is swung open at an angle, the USB device is slid into the interior of the door to mate with the USB port, and the access door is then closed flush with the computer case. The access door allows any USB device, small enough to fit inside the access door, to be removably attached to the interior of the computer, thus reducing the potential of the USB device being lost or stolen.

18 Claims, 8 Drawing Sheets

INTERNAL USB DRIVE HOUSING BAY

BACKGROUND OF THE INVENTION

1. Technical Field

The present invention relates in general to the field of computers, and in particular to coupling external devices, such as disk drives, to a computer. Still more particularly, the present invention relates to a method and system for connecting an external device to an internal Universal Serial Bus (USB) port.

2. Description of the Related Art

In response to computers becoming more modular, a Universal Serial Bus (USB) interface standard was jointly developed in the 1990's by Intel Corporation, Microsoft Corporation, Compaq Computer Corporation, Digital Equipment Corporation, Northern Telecom Limited, NEC Corporation, and International Business Machines, Inc. The USB standard defines a high-speed serial data interface between a computer and add-on devices, such as keyboards, printers, scanners and secondary storage devices, including floppy disk drives, hard disk drives, and solid-state secondary storage drives. In computers that have USB compliant ports, such devices can be added or removed while the computer is powered up and running.

With the growing popularity of portable computing devices having USB compliant ports, such as laptop (notebook) computers, tablet computers, and personal digital assistants (PDA's), the USB ports afford on-the-go flexibility to a user/owner of the portable computing device. That is, the user of a laptop computer can carry multiple external peripheral devices such as described above, and simply plug the needed external peripheral device into the portable computing device when needed.

Figure 1:
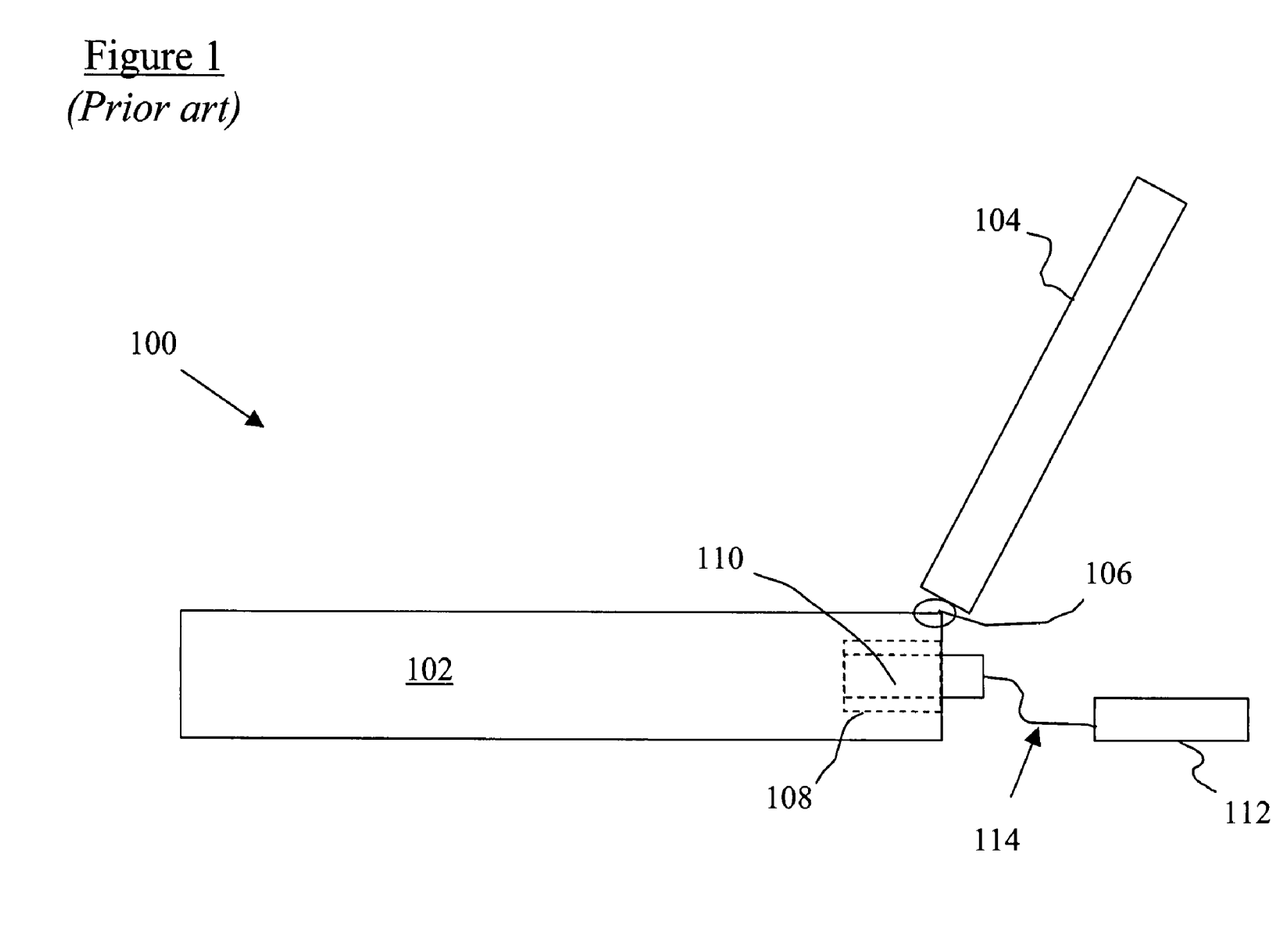
FIG. 1 depicts a prior art computer having an external Universal Serial Bus (USB) port.

A typical portable computing device is illustrated in FIG. 1 as computer 100. Computer 100 includes a base 102, to which is attached a display 104 with a display hinge 106. At the back of computer 100 is a USB port (female) 108, which is capable of receiving a USB plug (male) 110. USB plug 110 connects an external cable 114 to exemplary USB storage device 112, a common external peripheral device, which may be a mechanical hard drive or a solid-state disk.

By being able to freely connect and disconnect the secondary storage to and from the computer, the user is able to store and share large amounts of data. However, because these secondary storage devices are so easily removed and are typically small, they are often misplaced or stolen.

Also, being attached externally, all such external peripheral devices are prone to damage when the computer is moved. That is, it is common for the user to forget that the external peripheral device is attached to the back of the laptop, and when the laptop is picked up, the secondary storage device is dropped or otherwise damaged.

What is needed, therefore, is a method and device that allows a peripheral device, such as a USB compatible storage device, to connect to a computer while minimizing the potential of the peripheral device being lost or stolen.

SUMMARY OF THE INVENTION

The present invention is therefore directed to a method and system for internally connecting a Universal Serial Bus (USB) device to a computer. An access door, hinged within a computer case, has a USB port attached to an interior of the door. To connect the USB device, the access door is swung open at an angle, the USB device is slid into the interior of the door to mate with the USB port, and the access door is then closed flush with the computer case. The access door allows any USB device, small enough to fit inside the access door, to be removably attached to the interior of the computer, thus reducing the potential of the USB device being lost or stolen.

In a preferred embodiment, the access door has an electronic lock, which can be unlocked only by inputting a special code from the computer's keyboard or other input device.

The above, as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, where:

DETAILED DESCRIPTION OF A PREFERRED EMBODIMENT

Figure 2A:
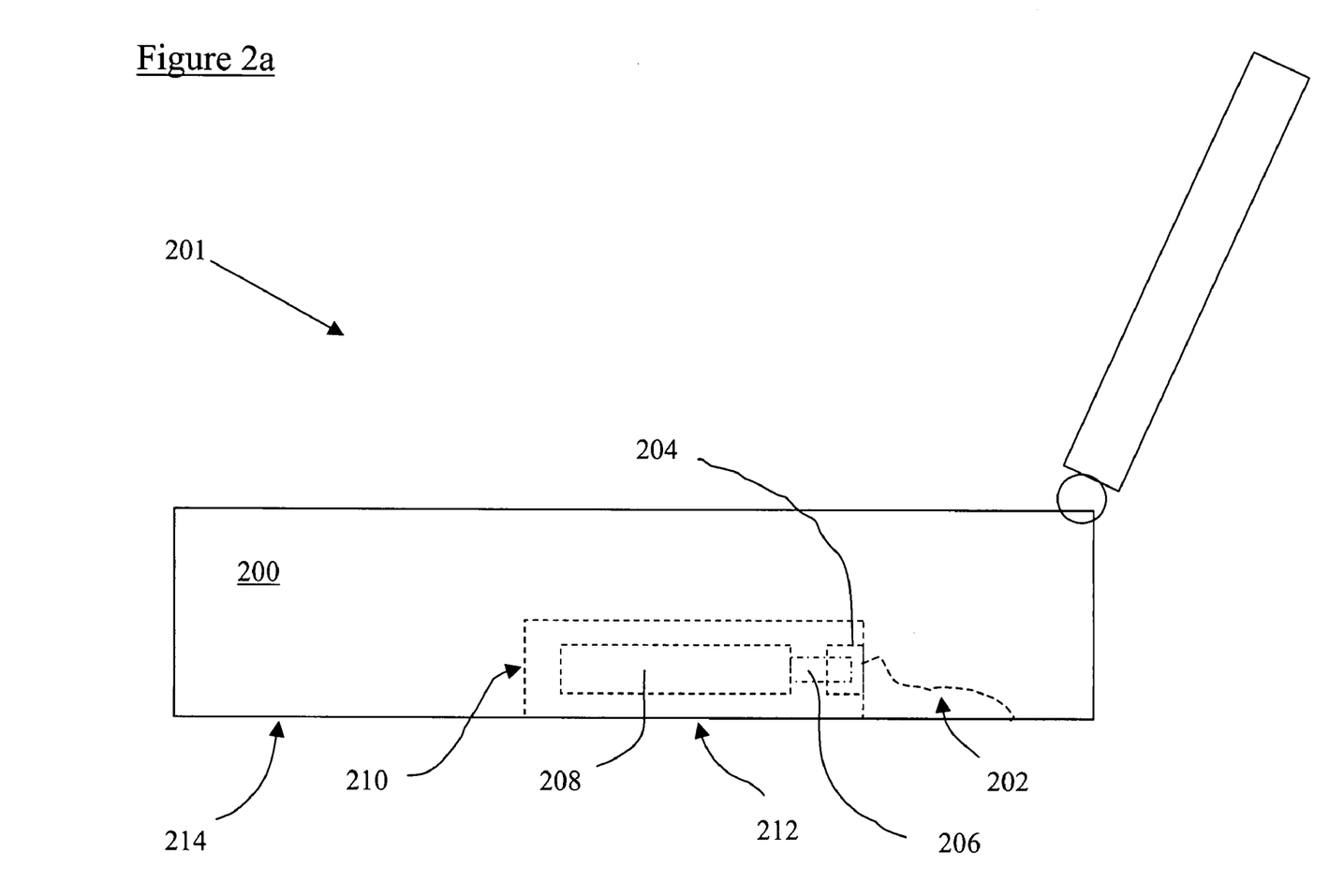
FIG. 2a illustrates the present invention having an internally mounted USB port and device.

With reference now to FIG. 2a, there is depicted a computer 201 incorporating novel features of the present invention. A base 200 has a base external surface 214, shown in FIG. 2 as the bottom surface of base 200. Inside base 200 is an internal Universal Serial Bus (USB) cable 202, connecting an internal USB female port 204 to a Southbridge chipset (not shown) or analogous input/output bus in computer 201. Internal USB female port 204 is configured to receive an internal USB male connector 206 of an internally mounted USB device 208 as shown. The USB devices (202, 204, 206, 208) preferably comply with USB Standard Revision 2.0 (or subsequent revisions), published Apr. 27, 2002 by Compaq Computer Corporation et al., which is herein incorporated by reference in its entirety.

Figure 2B:
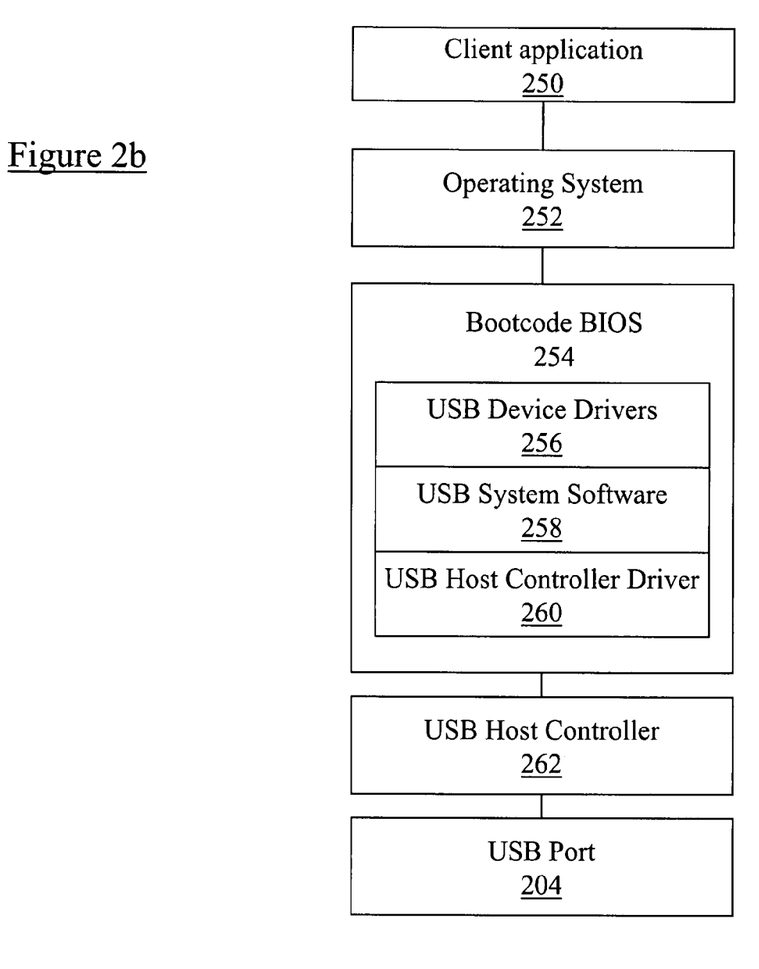
FIG. 2b depicts a USB software hierarchy as used by the present invention.

Referring now to FIG. 2b, there is illustrated a block diagram of software utilized by the present invention's USB environment. Hierarchically below a client application 250 and an operating system 252 is a bootcode BIOS 254, which is loaded by computer 201 at startup. Bootcode BIOS 254 includes a USB host controller driver 260 that provides a low-level interface to USB host controller 262 (i.e., the hardware within computer 201 that sends and receives data to and from the USB port 204). In addition, the bootcode BIOS 254 includes a USB system software 258, which provides a mid-level interface to USB host controller driver 260. When loaded by the startup program (not shown), bootcode BIOS 254 may also include generic USB device drivers 256 for certain USB devices, such as internally mounted USB device 208.

Referring again to FIG. 2a, internally mounted USB device 208 is secured to a USB access door 210, which when closed, is flush with base exterior surface 214. By mating flush with base exterior surface 214, USB access door 210 allows the user to add a device without changing the external geometry of computer 201.

Figure 3A:
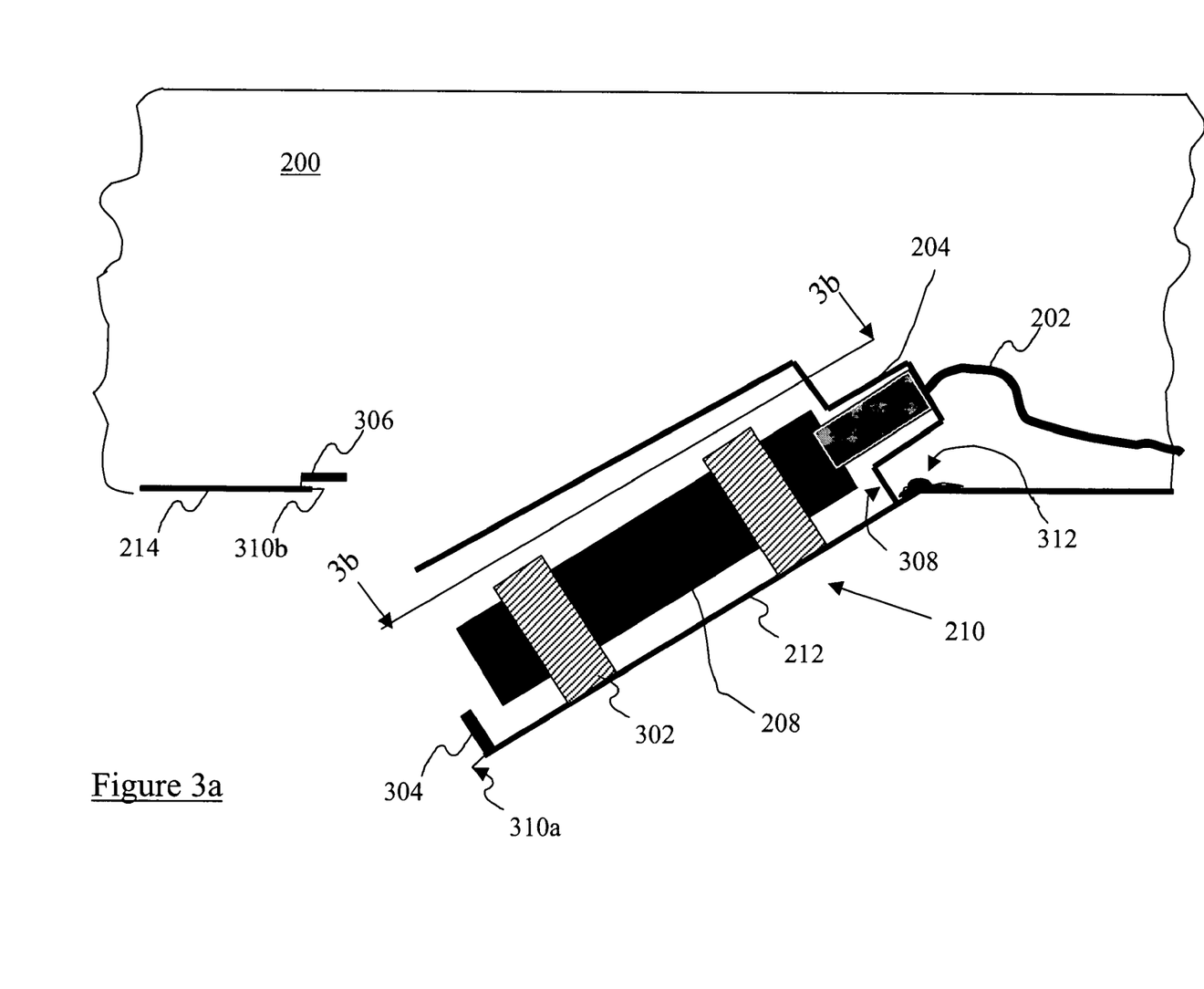
FIGS. 3a and 3b illustrate additional detail of an access door used to access and secure the internally mounted USB device.
Figure 3B:
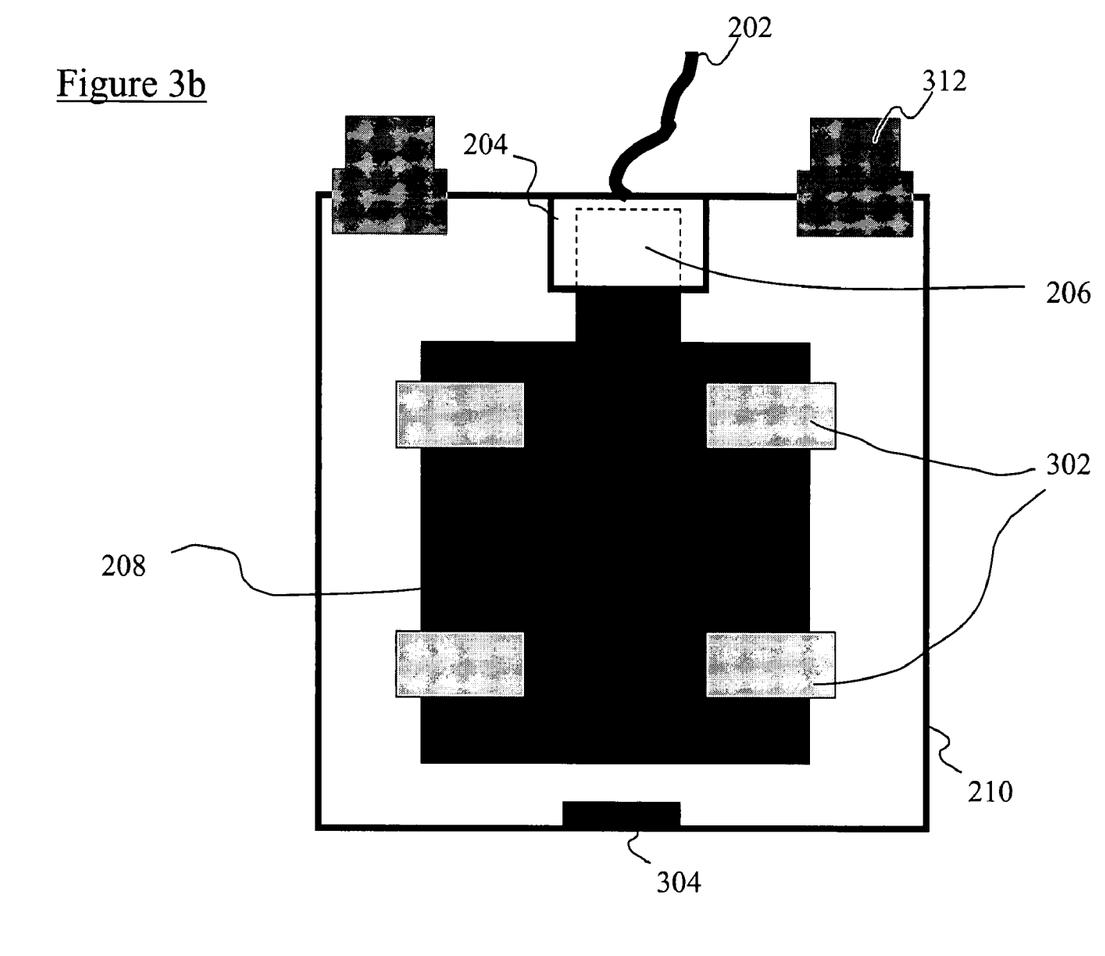

Additional details of USB access door 210 are shown in FIGS. 3a and 3b. As depicted in FIG. 3a, USB access door 210 is hinged to an interior surface of base 200 by access door hinges 312. Access door hinges 312 permit USB access door 210 to travel outwardly away from base 200 at an angle that allows internally mounted USB device 208 to be removed or inserted as shown. In a preferred embodiment, USB access door 210 includes a lip 310a that mates against a base stop 310b such that the closing travel of USB access door 210 ends when USB access door 210 is flush with base exterior surface 214.

In a preferred embodiment, also attached to USB access door 210 is a switch engager 304, which engages a USB turn-on switch 306 when USB access door 210 is closed. USB turn-on switch 306 passes a disabling signal to USB host controller 262 (shown in FIG. 2b) when USB access door 210 is open. When USB access door 210 is closed, USB turn-on switch 306 is turned off, thus removing the disabling signal, and allowing internally mounted USB device 208 to function normally. USB turn-on switch 306 provides an additional assurance that USB access door 210 is properly closed, to prevent damage to both USB access door 210 as well as internally mounted USB device 208.

With reference to FIG. 3b, note that securement clips 302 are of sufficient dimensions to allow different sized internally mounted USB device 208 to be secured to USB access door 210. That is, different internally mounted USB devices 208 that fit under the securement clips 302 can be interchanged on USB access door 210 for mating with USB port 204. This is a significant improvement to prior art systems that permitted an interchange of components (such as a hard drive and a floppy disk drive) into a same orifice of a computer, but only if the different components each had the same geometry to fit into the orifice. While not shown, it is understood that securement clips 302 may be slidably adjustable in order to accommodate different sized USB devices 208.

Figure 4A:
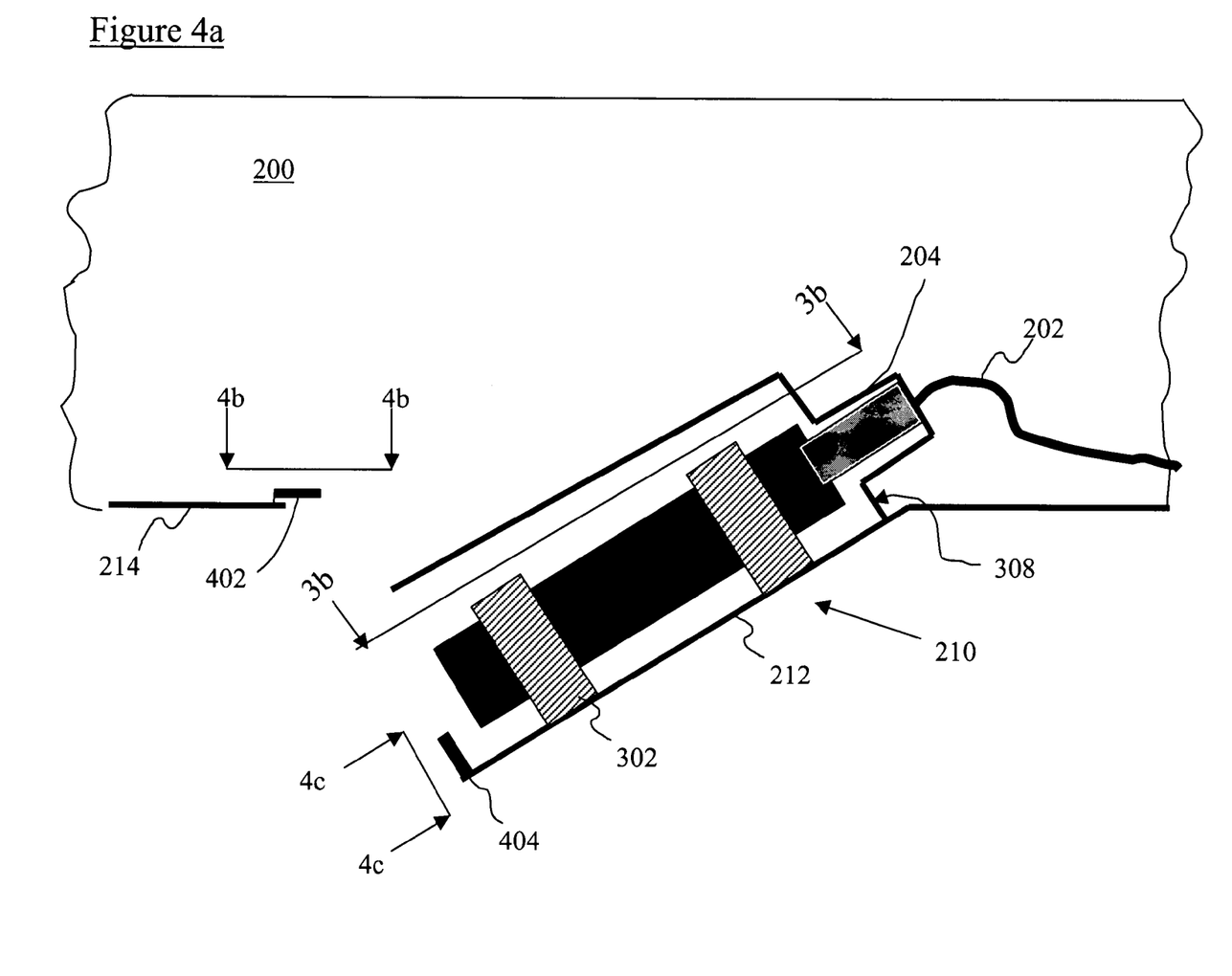
FIGS. 4a–4c depict details of an electronic lock for securing the access door.
Figure 4B:
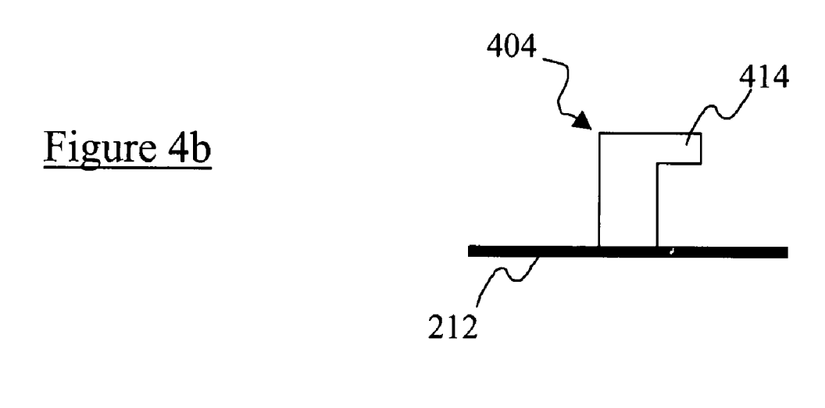
Figure 4C:
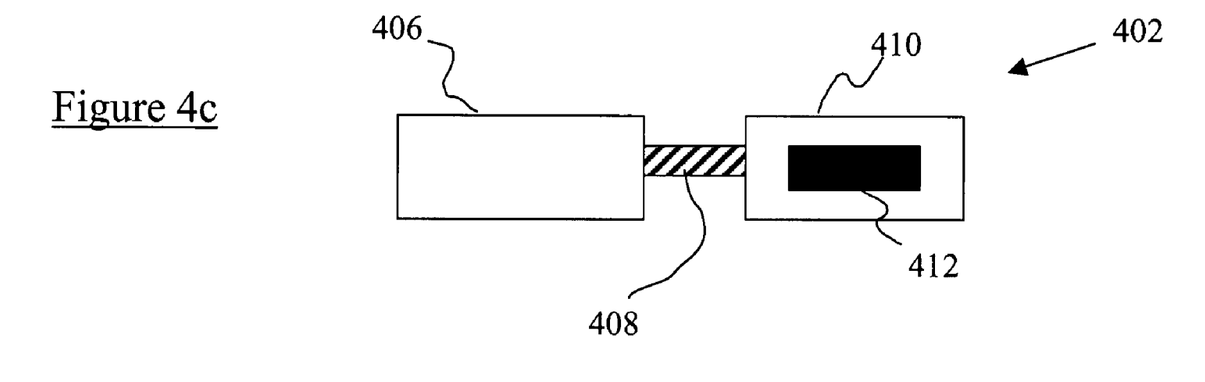

As shown now in FIG. 4a, in a preferred embodiment USB access door 210 includes a means of being internally locked. An attaching member 404, shown in greater detail in FIG. 4b, has a lateral extension 414 as shown. When USB access door 210 is closed, attaching member 404 inserts into an opening 412 of a receiver 410 of an electric lock 402, as seen in greater detail in FIG. 4c. To lock electric lock 402, a signal is sent to an actuator 406, which moves a force transmitting member 408 to position receiver 410 such that receiver 410 secures and prevents movement of attaching member 404, which has been inserted into opening 412 when USB access door 210 closed.

To unlock electric lock 402, an unlocking signal is sent to actuator 406 to move receiver 410 to a position that allows attaching member 404 to exit through opening 412. The locking and unlocking signals are controlled through software in computer 201, in any manner known to those skilled in the art of electronic controls. Preferably, the software permits locking and unlocking only when a code is entered into computer 201. This code, which may be prompted for entry by a drop-down menu, pop-up window, or any other graphical user interface (GUI) for prompting an input from a keyboard, mouse, or other input device, may be the same or different for locking and unlocking electric lock 402. In the event of a software or electrical failure, a back-up means of entry (e.g., an overriding mechanical lock, a set-screw having an unorthodox head inset design, etc.) may be provided to open USB access door 210.

Figure 5:
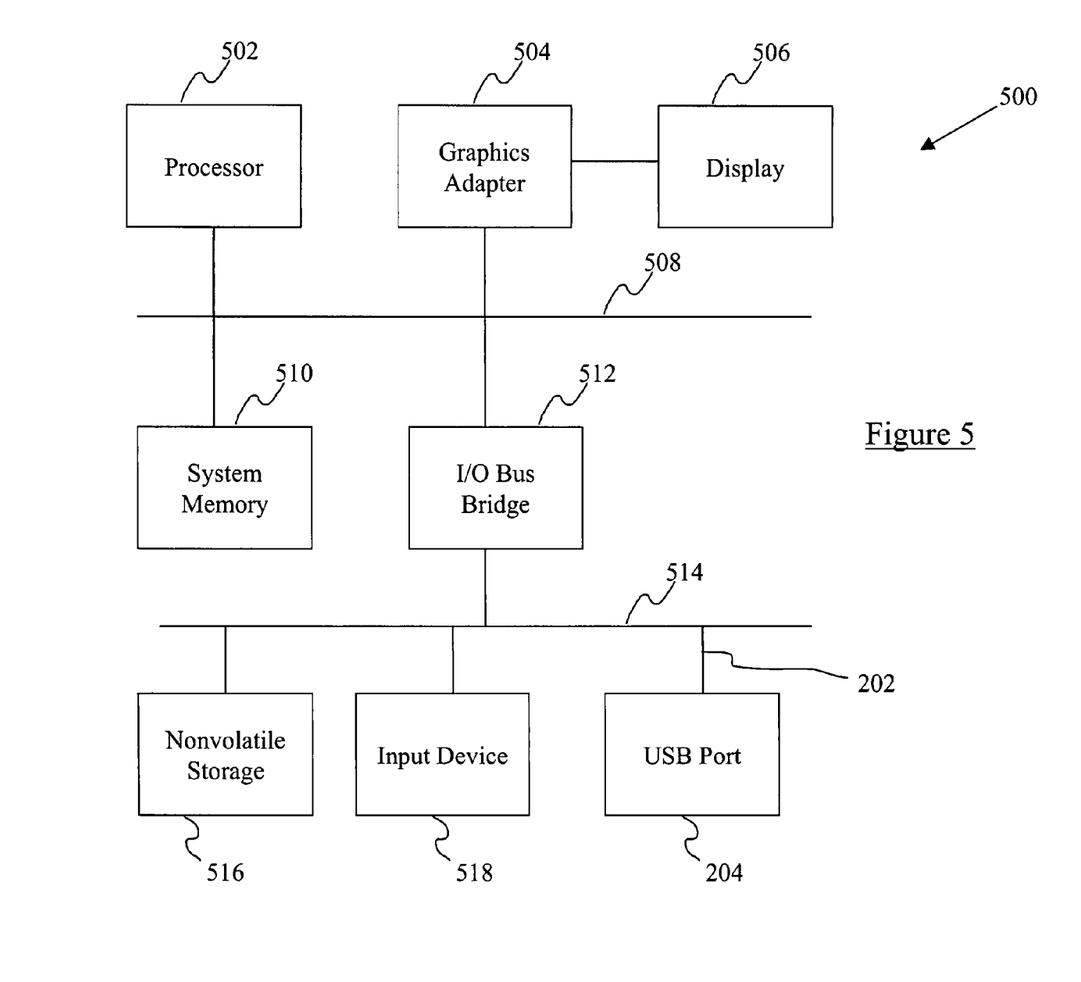
FIG. 5 depicts a preferred data processing system used by and to control the present invention.

With reference now to FIG. 5, there is depicted a block diagram of a preferred embodiment of hardware 500, within computer 201, used to implement the present invention. Hardware 500 is used to run all software described in FIG. 2b.

Hardware 500 includes a processor 502, which is connected to a system bus 508. In the exemplary embodiment, data processing system 500 includes a graphics adapter 504 also connected to system bus 508, receiving information for display 506.

Also connected to system bus 508 are system memory 510 and input/output (I/O) bus bridge 512. I/O bus bridge 512 couples I/O bus 514 to system bus 508, relaying and/or transforming data transactions from one bus to the other. Peripheral devices such as nonvolatile storage 516, which may be a hard disk drive, floppy drive, a compact disk read-only memory (CD-ROM), a digital video disk (DVD) drive, or the like, and input device 518, which may include a conventional mouse, a trackball, or the like, is connected to I/O bus 514. The software described for controlling electronic lock 402 in FIG. 4 is preferably stored in both system memory 510 and nonvolatile storage 516. Finally, the USB port 204 described in FIG. 2 et seq. is connected to I/O bus 514 via internal USB cable 202. In an alternate preferred embodiment, computer 200 utilizes a Northbridge/Southbridge architecture (not shown), in which USB port 204 is supported from the Southbridge chipset.

The exemplary embodiment shown in FIG. 5 is provided solely for the purposes of explaining the invention and those skilled in the art will recognize that numerous variations are possible, both in form and function. For instance, hardware 500 might also include a sound card and audio speakers, and numerous other optional components. All such variations are believed to be within the spirit and scope of the present invention.

It should be understood that at least some aspects of the present invention may alternatively be implemented in a program product, preferably performing the functions of the present invention in an automatic manner based on predetermined criteria as described, including relative logical relationships between and among logic areas. Programs defining functions on the present invention can be delivered to a data storage system or a computer system via a variety of signal-bearing media, which include, without limitation, non-writable storage media (e.g., CD-ROM), writable storage media (e.g., a floppy diskette, hard disk drive, read/write CD ROM, optical media), and communication media, such as computer and telephone networks including Ethernet. It should be understood, therefore in such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

While the invention has been particularly shown and described with reference to a preferred embodiment, it will be understood by those skilled in the art that various changes in form and detail may be made therein without departing from the spirit and scope of the invention.

What is claimed is:

1. A housing bay providing access to an internal data port in a computer, the housing bay comprising:
   an access door rotatably connected to an opening of a computer housing, wherein the access door occludes the opening in the computer housing when the access door is closed, the access door having:
      an electronic lock for locking the access door in a closed position, the electronic lock being capable of being unlocked by inputting a code into the computer,
      a hinged end having a hinge that is connected to the computer housing,
      a data port proximate to the hinged end of the access door, the data port capable of providing a data connection between a data line inside the computer and an peripheral device, and
      an open end for manually accessing the peripheral device when coupling or decoupling the peripheral device to the data port;
   wherein, when open, the access door angles away from an exterior surface of the computer to allow the peripheral device to be inserted into or removed from the data port, the data port being in an interior of the computer.

2. The housing bay of claim 1, wherein the peripheral device is inoperable when the access door is open.

3. The housing bay of claim 1, wherein, when closed, the access door is co-planar to the exterior surface of the computer, the peripheral device being operable when the access door is close.

4. The housing bay of claim 3, wherein the access door is co-planar to the exterior surface of the computer regardless of whether the peripheral device is inside the computer or not.

5. The housing bay of claim 1, wherein the data port is physically connected to the hinged end of the access door.

6. The housing bay of claim 1, further comprising:
   securement clips physically attached to the access door, the securement clips securing the peripheral device to an interior of the access door, and the securement clips providing an alignment for a connection of the peripheral device to the data port.

7. The housing bay of claim 1, wherein the data port is a universal serial bus (USB) port.

8. The housing bay of claim 1, wherein the peripheral device is a data storage device.

9. The housing bay of claim 1, further comprising:
   a switch plunger on the access door, the switch plunger being aligned with a disabling switch inside the computer, the disabling switch disabling the data port inside the computer.

10. A method for providing access to a peripheral device to a computer, the method comprising:
    providing an access door that is rotatably connected to an opening of a computer housing, wherein the access door occludes the opening in the computer housing when the access door is closed, the access door having:
       a hinged end having a hinge that is connected to a computer housing,
       a data port proximate to the hinged end of the access door, the data port capable of providing a data connection between a data line inside the computer and an peripheral device, and
       an open end for manually accessing the peripheral device when coupling or decoupling the peripheral device to the data port;
    wherein, when open, the access door angles away from the exterior surface of the computer to allow the peripheral device to be inserted into or removed from an interior of the computer; and
    disabling the external device when the access door is open using a switch engager on the access door, the switch engager being aligned with a disabling switch in the computer, the disabling switch disabling the data line inside the computer.

11. The method of claim 10, wherein the peripheral device is inoperable when the access door is open.

12. The method of claim 10, wherein, when closed, the access door is co-planar to the exterior surface of the computer, the peripheral device being operable when the access door is closed.

13. The method of claim 12, wherein the access door is co-planar to the exterior surface of the computer regardless of whether the peripheral device is inside the computer or not.

14. The method of claim 10, wherein the data port is physically connected to the hinged end of the access door.

15. The method of claim 10, further comprising:
    securing the peripheral device to the access door using securement clips that are attached to the access door, the securement clips providing an alignment of a connector of the peripheral device to the data port.

16. The method of claim 10, wherein the connection port is a universal serial bus (USB) connection port.

17. The method of claim 10, wherein the storage device is a solid state storage device having no moving internal parts.

18. A computer having a housing bay that provides access to an internal data port in the computer, the housing bay comprising:
    an access door rotatably connected to an opening of a computer housing, wherein the access door occludes the opening in the computer housing when the access door is closed, the access door having:
       a switch plunger on the access door, the switch plunger being aligned with a disabling switch inside the computer, the disabling switch disabling the data port inside the computer;
       a hinged end having a hinge that is connected to the computer housing,
       a data port proximate to the hinged end of the access door, the data port capable of providing a data connection between a data line inside the computer and an peripheral device, and
       an open end for manually accessing the peripheral device when coupling or decoupling the peripheral device to the data port;
    wherein, when open, the access door angles away from an exterior surface of the computer to allow the peripheral device to be inserted into or removed from the data port, the data port being in an interior of the computer.

* * * * *